(12) United States Patent  (10) Patent No.: US 8,306,202 B2
Citron et al.  (45) Date of Patent: Nov. 6, 2012

(54) METHOD AND SYSTEM FOR CUSTOMIZED CALLER IDENTIFICATION

(75) Inventors: Jeffrey Citron, Holmdel, NJ (US); Louis Mamakos, Lawrenceville, NJ (US)

(73) Assignee: Vonage Network LLC, Holmdel, NJ (US)

( * ) Notice: Subject to any disclaimer, the term of this patent is extended or adjusted under 35 U.S.C. 154(b) by 1696 days.

(21) Appl. No.: 11/594,733

(22) Filed: Nov. 9, 2006

(65) Prior Publication Data

US 2007/0127656 A1  Jun. 7, 2007

Related U.S. Application Data

(60) Provisional application No. 60/734,783, filed on Nov. 9, 2005.

(51) Int. Cl.
*H04M 1/56* (2006.01)
*H04M 15/06* (2006.01)
*H04M 3/42* (2006.01)

(52) U.S. Cl. ............... 379/142.07; 379/142.06; 455/415

(58) Field of Classification Search ............ 379/142.01, 379/142.04, 142.06, 142.07, 142.15; 455/414.1, 455/415
See application file for complete search history.

(56) References Cited

U.S. PATENT DOCUMENTS

| | | |
|---|---|---|
| 4,100,377 A | 7/1978 | Flanagan |
| 4,748,620 A | 5/1988 | Adelmann et al. |
| 4,777,354 A | 10/1988 | Thomas |
| 4,782,485 A | 11/1988 | Gollub |
| 5,018,136 A | 5/1991 | Gollub |
| 5,425,085 A | 6/1995 | Weinberger et al. |
| 5,444,707 A | 8/1995 | Cerna et al. |
| 5,452,289 A | 9/1995 | Sharma et al. |
| 5,519,769 A | 5/1996 | Weinberger et al. |
| 5,526,353 A | 6/1996 | Henley et al. |
| 5,572,576 A | 11/1996 | Klausner et al. |
| 5,623,490 A | 4/1997 | Richter et al. |
| 5,638,433 A | 6/1997 | Bubien, Jr. et al. |
| 5,835,126 A | 11/1998 | Lewis |
| 5,966,427 A | 10/1999 | Shaffer et al. |
| 5,995,491 A | 11/1999 | Richter et al. |

(Continued)

FOREIGN PATENT DOCUMENTS

CN 1581900 A 2/2005

(Continued)

OTHER PUBLICATIONS

Johnston, A., et al. "SIP Call Flow Examples" IETF Standard-Working-Draft, Internet Engineering Task Force (IETF), CH, vol. sip, No. 4 Apr. 2001, pp. 1-72, XP015027711, ISSN: 000-0004.

(Continued)

*Primary Examiner* — Quoc D Tran
(74) *Attorney, Agent, or Firm* — Duane Morris LLP; Joseph Pagnotta

(57) ABSTRACT

A system and method for customized caller identification and call routing are disclosed. A disclosed method of providing customized caller identification information for a phone call includes associating a first phone number in a database with a plurality of user specified identifications, selecting one of the plurality of user specified identifications in response to the phone call placed from the first phone number to a second phone number as a function of the second phone number, and providing the selected one of the plurality of identifications to a device associated with the second telephone number.

12 Claims, 7 Drawing Sheets

U.S. PATENT DOCUMENTS

| | | |
|---|---|---|
| 6,014,437 A | 1/2000 | Acker et al. |
| 6,067,516 A | 5/2000 | Levay et al. |
| 6,084,956 A | 7/2000 | Turner et al. |
| 6,097,804 A | 8/2000 | Gilbert et al. |
| 6,104,706 A | 8/2000 | Richter et al. |
| 6,104,711 A | 8/2000 | Voit |
| 6,115,460 A | 9/2000 | Crowe et al. |
| 6,115,468 A | 9/2000 | De Nicolo |
| 6,118,860 A | 9/2000 | Hillson et al. |
| 6,122,364 A | 9/2000 | Petrunka et al. |
| 6,128,304 A | 10/2000 | Gardell et al. |
| 6,128,379 A | 10/2000 | Smyk |
| 6,137,869 A | 10/2000 | Voit et al. |
| 6,138,072 A | 10/2000 | Nagai |
| 6,167,042 A | 12/2000 | Garland et al. |
| 6,169,741 B1 | 1/2001 | LeMaire et al. |
| 6,175,565 B1 | 1/2001 | McKinnon et al. |
| 6,178,239 B1 | 1/2001 | Kishinsky et al. |
| 6,185,285 B1 | 2/2001 | Relyea et al. |
| 6,188,762 B1 | 2/2001 | Shooster |
| 6,195,425 B1 | 2/2001 | Farris |
| 6,226,286 B1 | 5/2001 | Danne et al. |
| 6,226,361 B1 | 5/2001 | Koyama |
| 6,243,443 B1 | 6/2001 | Low et al. |
| 6,249,576 B1 | 6/2001 | Sassin et al. |
| 6,266,405 B1 | 7/2001 | Madour et al. |
| 6,272,126 B1 | 8/2001 | Strauss et al. |
| 6,282,281 B1 | 8/2001 | Low |
| 6,282,284 B1 | 8/2001 | Dzonno et al. |
| 6,282,574 B1 | 8/2001 | Voit |
| 6,292,553 B1 | 9/2001 | Fellingham et al. |
| 6,298,062 B1 | 10/2001 | Gardell et al. |
| 6,298,064 B1 | 10/2001 | Christie |
| 6,304,572 B1 | 10/2001 | Christie |
| 6,304,637 B1 | 10/2001 | Mirashrafi et al. |
| 6,304,653 B1 | 10/2001 | O'Neal et al. |
| 6,310,941 B1 | 10/2001 | Crutcher et al. |
| 6,311,182 B1 | 10/2001 | Colbath et al. |
| 6,320,951 B1 | 11/2001 | Shtivelman et al. |
| 6,327,572 B1 | 12/2001 | Morton et al. |
| 6,330,317 B1 | 12/2001 | Garfinkel |
| 6,337,899 B1 | 1/2002 | Alcendor et al. |
| 6,343,115 B1 | 1/2002 | Foladare et al. |
| 6,349,132 B1 | 2/2002 | Wesemann et al. |
| 6,351,464 B1 | 2/2002 | Galvin et al. |
| 6,351,526 B1 | 2/2002 | Shaffer et al. |
| 6,359,880 B1 | 3/2002 | Curry et al. |
| 6,366,577 B1 | 4/2002 | Donovan |
| 6,366,661 B1 | 4/2002 | Devillier et al. |
| 6,373,836 B1 | 4/2002 | Deryugin et al. |
| 6,373,936 B1 | 4/2002 | Raniere et al. |
| 6,373,938 B1 | 4/2002 | Palacious et al. |
| 6,385,209 B1 | 5/2002 | Skirmont et al. |
| 6,389,119 B1 | 5/2002 | McBride |
| 6,393,115 B1 | 5/2002 | Krauss et al. |
| 6,393,476 B1 | 5/2002 | Barnhouse et al. |
| 6,400,820 B1 | 6/2002 | Edwards et al. |
| 6,404,746 B1 | 6/2002 | Cave et al. |
| 6,404,882 B2 | 6/2002 | Fellner et al. |
| 6,404,884 B1 | 6/2002 | Marwell et al. |
| 6,408,062 B1 | 6/2002 | Cave |
| 6,408,065 B1 | 6/2002 | O'Neal et al. |
| 6,411,697 B1 | 6/2002 | Creamer et al. |
| 6,411,704 B1 | 6/2002 | Pelletier et al. |
| 6,415,269 B1 | 7/2002 | Dinwoodie |
| 6,421,437 B1 | 7/2002 | Slutsman |
| 6,424,707 B1 | 7/2002 | Chatterjee |
| 6,430,175 B1 | 8/2002 | Echols et al. |
| 6,430,176 B1 | 8/2002 | Christie, IV |
| 6,430,275 B1 | 8/2002 | Voit et al. |
| 6,430,289 B1 | 8/2002 | Liffick |
| 6,434,143 B1 | 8/2002 | Donovan |
| 6,442,242 B1 | 8/2002 | McAllister et al. |
| 6,446,127 B1 | 9/2002 | Schuster et al. |
| 6,452,932 B1 | 9/2002 | Christie |
| 6,456,618 B2 | 9/2002 | Kozdon et al. |
| 6,463,052 B1 | 10/2002 | Christie |
| 6,466,570 B1 | 10/2002 | Low et al. |
| 6,470,010 B1 | 10/2002 | Szviatovszki et al. |
| 6,473,429 B1 | 10/2002 | Christie |
| 6,480,484 B2 | 11/2002 | Morton |
| 6,480,581 B1 | 11/2002 | Wu et al. |
| 6,487,200 B1 | 11/2002 | Fraser |
| 6,493,337 B1 | 12/2002 | Stevenson, III |
| 6,493,437 B1 | 12/2002 | Olshansky |
| 6,496,477 B1 | 12/2002 | Perkins et al. |
| 6,504,921 B2 | 1/2003 | Kotik et al. |
| 6,510,219 B1 | 1/2003 | Wellard et al. |
| 6,519,232 B1 | 2/2003 | Becher |
| 6,519,333 B1 | 2/2003 | Malik |
| 6,539,077 B1 | 3/2003 | Ranalli et al. |
| 6,542,589 B1 | 4/2003 | Baskin |
| 6,553,023 B1 | 4/2003 | Yamamiya et al. |
| 6,564,261 B1 | 5/2003 | Gudjonsson et al. |
| 6,567,398 B1 | 5/2003 | Aravamudan et al. |
| 6,567,419 B1 | 5/2003 | Yarlagadda |
| 6,571,212 B1 | 5/2003 | Dent |
| 6,577,712 B2 | 6/2003 | Larsson et al. |
| 6,584,094 B2 | 6/2003 | Maroulis et al. |
| 6,584,098 B1 | 6/2003 | Dutnall |
| 6,584,186 B1 | 6/2003 | Aravamudan et al. |
| 6,584,510 B2 | 6/2003 | Anttila |
| 6,587,836 B1 | 7/2003 | Ahlberg et al. |
| 6,597,685 B2 | 7/2003 | Miloslavsky et al. |
| 6,614,786 B1 | 9/2003 | Byers |
| 6,614,899 B1 | 9/2003 | Sollee et al. |
| 6,621,899 B2 | 9/2003 | Dezonno et al. |
| 6,628,760 B2 | 9/2003 | Mirashrafi et al. |
| 6,633,561 B2 | 10/2003 | Christie |
| 6,650,890 B1 | 11/2003 | Irlam et al. |
| 6,665,294 B2 | 12/2003 | Christie |
| 6,665,389 B1 | 12/2003 | Haste, III |
| 6,665,392 B1 | 12/2003 | Wellner et al. |
| 6,668,055 B2 | 12/2003 | Marwell et al. |
| 6,681,252 B1 | 1/2004 | Schuster et al. |
| 6,690,780 B2 | 2/2004 | Kotik et al. |
| 6,694,007 B2 | 2/2004 | Lang et al. |
| 6,697,475 B1 | 2/2004 | McLampy et al. |
| 6,707,811 B2 | 3/2004 | Greenberg et al. |
| 6,707,906 B1 | 3/2004 | Ben-Chanoch |
| 6,711,160 B2 | 3/2004 | Chan et al. |
| 6,714,988 B1 | 3/2004 | Takemoto et al. |
| 6,718,031 B2 | 4/2004 | Fellner et al. |
| 6,724,755 B1 | 4/2004 | Kim |
| 6,731,630 B1 | 5/2004 | Schuster et al. |
| 6,731,642 B1 | 5/2004 | Borella et al. |
| 6,731,741 B1 | 5/2004 | Fourcand et al. |
| 6,741,586 B1 | 5/2004 | Schuster et al. |
| 6,748,057 B2 | 6/2004 | Ranalli et al. |
| 6,760,429 B1 | 7/2004 | Hung et al. |
| 6,763,226 B1 | 7/2004 | McZeal, Jr. |
| 6,765,931 B1 | 7/2004 | Rabenko et al. |
| 6,769,020 B2 | 7/2004 | Miyazaki et al. |
| 6,771,637 B1 | 8/2004 | Suzuki et al. |
| 6,775,368 B1 | 8/2004 | Lee et al. |
| 6,778,661 B1 | 8/2004 | Yumoto et al. |
| 6,798,873 B2 | 9/2004 | Vardi et al. |
| 6,819,752 B2 | 11/2004 | Raniere et al. |
| 6,822,945 B2 | 11/2004 | Petrovykh |
| 6,826,270 B1 | 11/2004 | Welch et al. |
| 6,839,359 B2 | 1/2005 | Skirmont et al. |
| 6,839,421 B2 | 1/2005 | Ferraro Esparza et al. |
| 7,103,163 B1 | 9/2006 | Cook |
| 2001/0005412 A1 | 6/2001 | Light et al. |
| 2001/0005415 A1 | 6/2001 | Grunsted et al. |
| 2001/0014919 A1 | 8/2001 | Tzirin |
| 2002/0007391 A1 | 1/2002 | Suzuki |
| 2002/0049815 A1 | 4/2002 | Dattatri |
| 2002/0049860 A1 | 4/2002 | Koitinen |
| 2002/0055879 A1 | 5/2002 | Wengrovitz et al. |
| 2002/0095516 A1 | 7/2002 | Nada |
| 2002/0112073 A1 | 8/2002 | McLampy et al. |
| 2002/0114430 A1 | 8/2002 | Murata |
| 2002/0126818 A1 | 9/2002 | Cai et al. |
| 2002/0129131 A1 | 9/2002 | Yamashita |
| 2002/0150083 A1 | 10/2002 | Fangman et al. |
| 2002/0191635 A1 | 12/2002 | Chow et al. |

| | | |
|---|---|---|
| 2003/0005280 A1 | 1/2003 | Bobde et al. |
| 2003/0041132 A1 | 2/2003 | Lim et al. |
| 2003/0043787 A1 | 3/2003 | Emerson, III |
| 2003/0053446 A1 | 3/2003 | Kwon |
| 2003/0095541 A1 | 5/2003 | Chang et al. |
| 2003/0095542 A1 | 5/2003 | Chang et al. |
| 2003/0108064 A1 | 6/2003 | Bilke et al. |
| 2003/0147518 A1 | 8/2003 | Albal et al. |
| 2003/0163526 A1 | 8/2003 | Clarisse et al. |
| 2003/0174695 A1 | 9/2003 | Lautenschlager et al. |
| 2003/0194078 A1 | 10/2003 | Wood et al. |
| 2003/0202504 A1 | 10/2003 | Dhara et al. |
| 2004/0028025 A1 | 2/2004 | Chang |
| 2004/0028207 A1 | 2/2004 | Kato |
| 2004/0039938 A1 | 2/2004 | Katz et al. |
| 2004/0057415 A1 | 3/2004 | Colson et al. |
| 2004/0114575 A1 | 6/2004 | Morita et al. |
| 2004/0114742 A1* | 6/2004 | Min et al. ............... 379/142.01 |
| 2004/0190711 A1 | 9/2004 | Miyajima |
| 2004/0205209 A1 | 10/2004 | Wengrovitz et al. |
| 2004/0205777 A1 | 10/2004 | Zalenski et al. |
| 2004/0215770 A1 | 10/2004 | Maher, III et al. |
| 2004/0223606 A1 | 11/2004 | Enete et al. |
| 2004/0258021 A1 | 12/2004 | Kashimoto et al. |
| 2004/0258238 A1 | 12/2004 | Wong |
| 2004/0258239 A1 | 12/2004 | Gallant et al. |
| 2005/0018659 A1 | 1/2005 | Gallant et al. |
| 2005/0031106 A1 | 2/2005 | Henderson |
| 2006/0026277 A1* | 2/2006 | Sutcliffe ........................ 709/224 |
| 2007/0129067 A1* | 6/2007 | Summer et al. ............ 455/414.1 |

FOREIGN PATENT DOCUMENTS

| | | |
|---|---|---|
| WO | 01/54441 A1 | 7/2001 |
| WO | 2005/022879 A1 | 3/2005 |

OTHER PUBLICATIONS

Rosenberg, J., et al. "STUN—Simple Traversal of UDP Through Network Address Translators" IETF Standard-Working-Draft, Internet Engineering Task Force (IETF), CH, vol. midcom, No. 3, Oct. 14, 2002, XP015002624, ISSN: 0000-0004.

Mahy, R., et al. "STUN—aware NAT draft-simu-midcom-stun-aware-nat-00.txt"IETF Standard-Working-Draft, Internet Engineering Task Force (IETF), CH, Apr. 10, 2002, XP015005296, ISSN: 0000-0004.

Mahy, R., et al. "Pre-Midcom Requirements for Traversal of NATs for traffic not supported by STUN draft-mahy-midcom-premidcom-relay-reqs-00.txt" IETF Standard-Working-Draft, Internet Engineering Taskforce, IETF, CH, Feb. 2003, XP015004271, ISSN: 0000-0004.

Fineberg, V. "A Practical Architecture for Implementing End-to-End QoS in an IP Network" Communications Magazine, IEEE vol. 40, Issue 1, Jan. 2002 pp. 122-130.

Melvin, H. et al. "Time Synchronization for VoIP Quality of Service", Internet Computing, IEEE vol. 6, Issue 3, May-Jun. 2002 pp. 57-63.

* cited by examiner

Fig. 1

| Calling Party 703-123-4567 101 | Called Party 1 703-123-4566 "Mom" 103 | Called Party 2 703-123-4565 "Mary" 105 | Called Party 3 703-123-4564 "Aunt Mary" 107 |
|---|---|---|---|

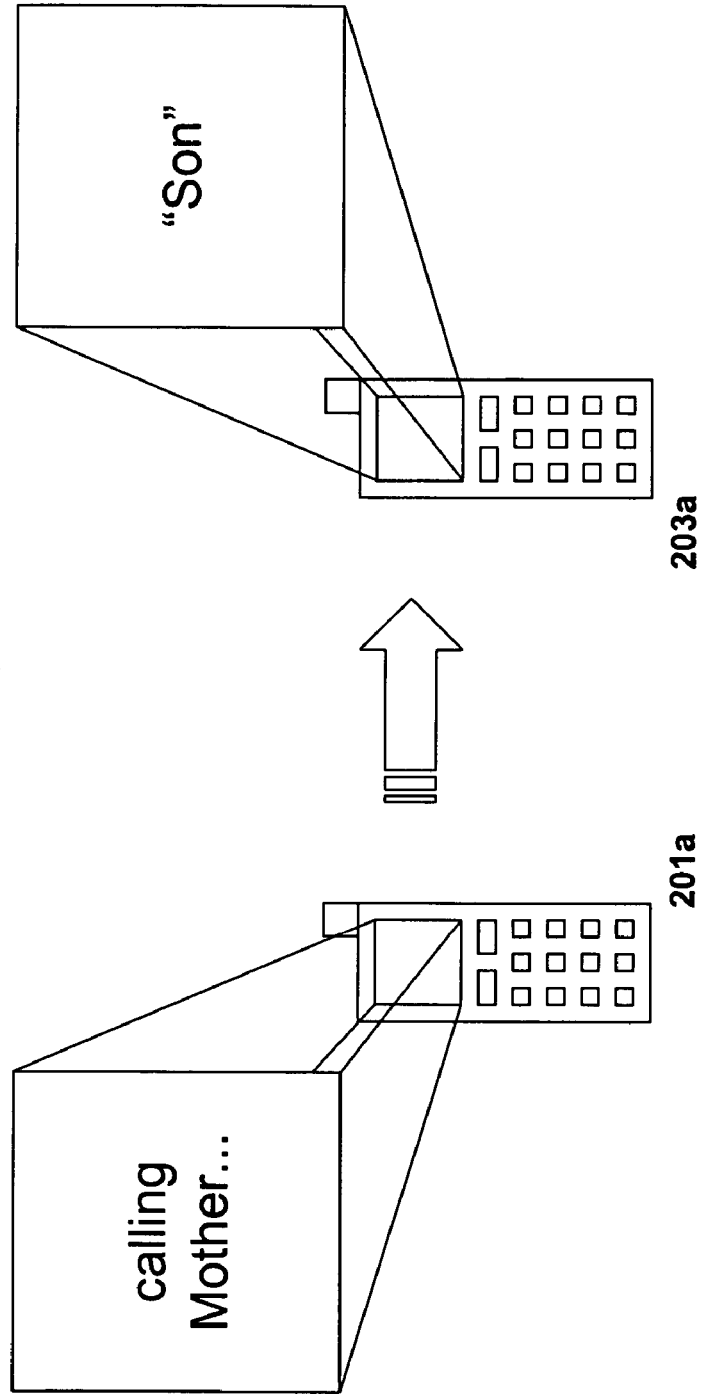

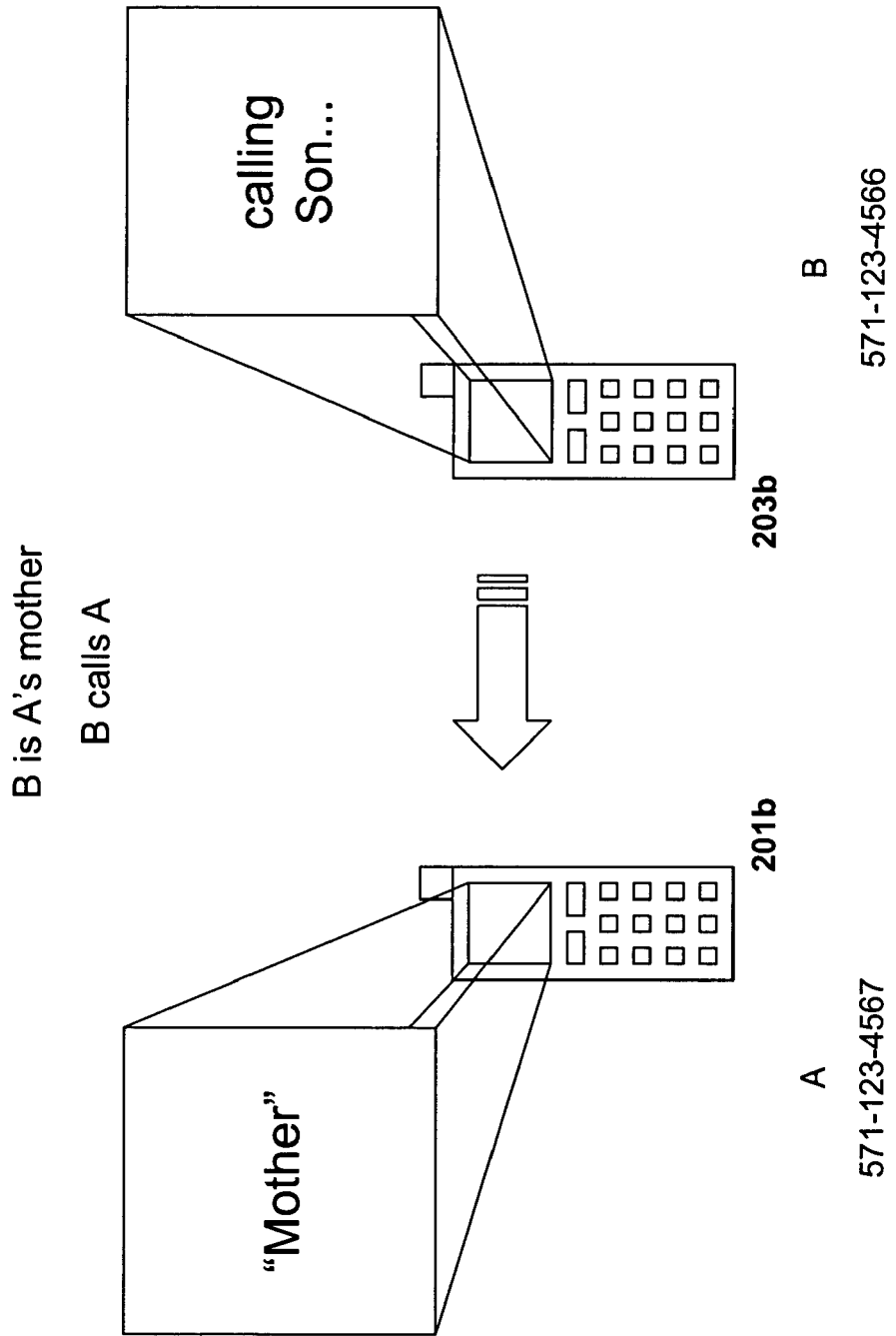

METHOD AND SYSTEM FOR CUSTOMIZED CALLER IDENTIFICATION

The disclosure claims the filing-date benefit of Provisional Application No. 60/734,783, filed 9 Nov. 2005, the specification of which is incorporated herein in its entirety.

FIELD OF THE INVENTION

The present disclosure relates generally to systems and methods involving associations between identifiers corresponding to a party initiating a communication and a party receiving the communication.

BACKGROUND

Caller name information is often centrally maintained on the Public Switched Telephone Network (PSTN) in a Caller Name (CNAM) database. The ability for a customer to override the listed caller information is limited to the local processing capability of the customer's telephone. For instance, a phone with speed dial memory or a built-in phone book may display the information from the phonebook entry corresponding to the phone number of the calling party. With the use of smart phones or programmable phones which maintain a phone book, the calling number can be associated with a name in the phone book such that the calling party can be identified by name. This only works, however, on devices so capable and programmed. Moreover, while such functionality is commonly available on smart cellular phones, it is not typically available on a "Plain Old" Telephone Service (POTS) phone.

For example, when customer A calls customer B, the PSTN accesses the CNAM database to provide the calling number or identity of customer A to customer B's phone. In the case where customer A calls customer B, his mother, customer B may have a mobile phone programmed with a local phone book that associates caller A's phone number as "Son." When the CNAM database provides caller A's phone number to customer B's phone, the phone will identify "Son" as associated with caller A's phone number and display "Son" to customer B. Having a phone programmed to associate the calling number with the identity of the caller suffers from several disadvantages. For example, the identification of caller A's phone number with "Son" must occur on each phone individually used by customer B, and thus requires that each phone desired to display the caller ID be specially programmed. By way of another example, if customer B loses the programmed phone or the phone ceases operating properly, customer B must entirely re-program a new phone to identify the calling parties.

SUMMARY

Various disclosed embodiments are generally directed to a system and method of providing customized caller identification information when a caller associated with a first identifier calls a user associated with a second identifier including associating the first identifier in a database with a plurality of user specified identifications, selecting one of the plurality of user specified identifications in response to a call placed from the first identifier to the second identifier, and providing the selected one of the plurality of identifications to the user associated with the second identifier. Thus, customized caller identification can be provided to the user of even a conventional phone without requiring preprogramming of the phone.

Further, various disclosed embodiments are generally directed to a system and method of routing calls in a telephone network including maintaining a database of a plurality of phone numbers, associating a first phone number with a second phone number in the database, providing a user selected call routing instruction for each associated pair of first and second phone numbers, and routing a phone call from the first phone number to a third phone number using the selected call routing instruction.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the claims.

BRIEF DESCRIPTION OF THE DRAWINGS

Various aspects of the present disclosure will be or become apparent to one with skill in the art by reference to the following detailed description when considered in connection with the accompanying exemplary non-limiting embodiments, wherein:

FIG. 1 illustrates an example of customized identification selection;

FIGS. 2a-c are further illustrations of customized identifications;

DETAILED DESCRIPTION

Figure 2C:
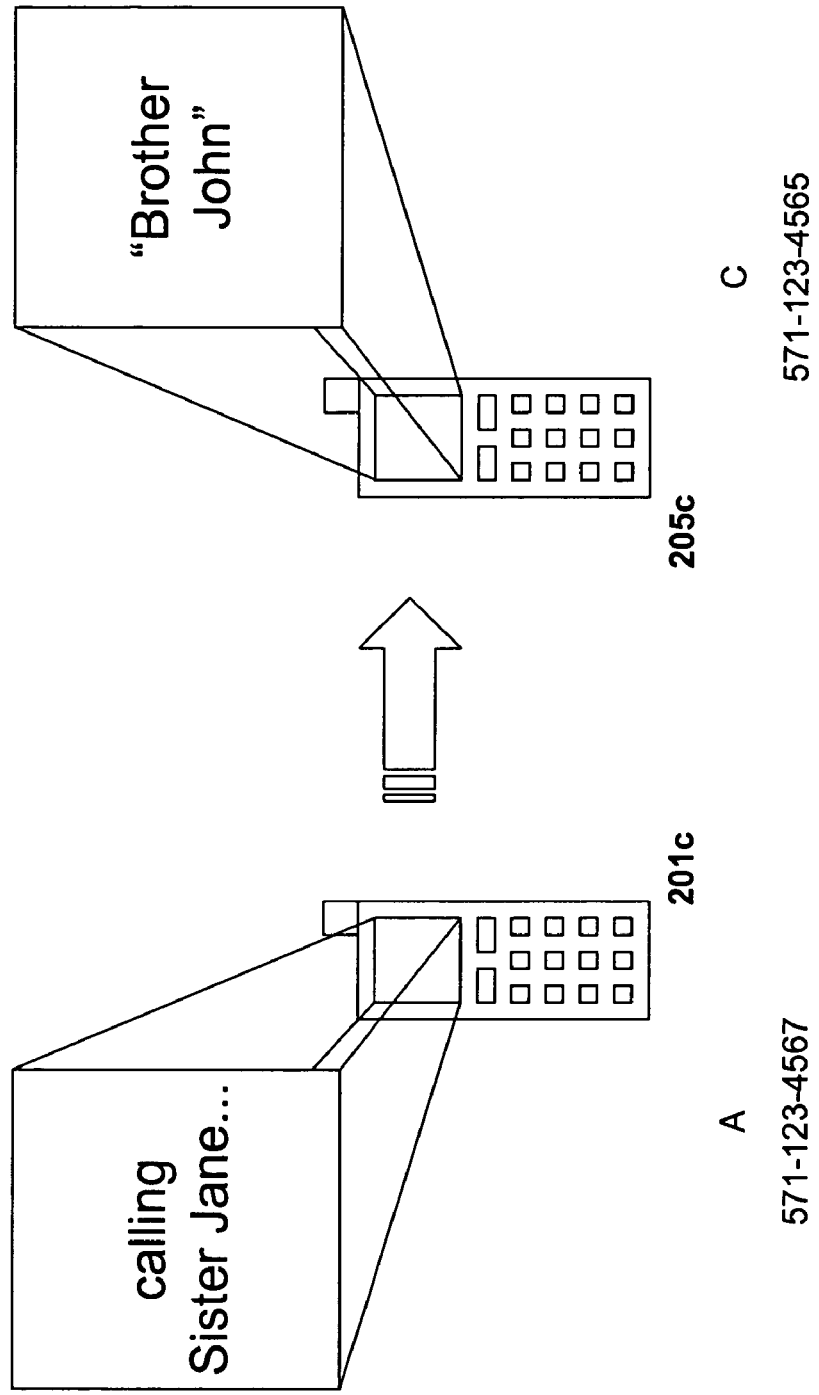

One aspect of the present disclosure includes providing customized caller identification information. Another aspect includes caching caller ID information. In yet another aspect, a user management system is provided. In a further aspect of the present disclosure, customized routing of a call is provided.

In one aspect, a caller information system is provided to return data including, but not limited to, caller ID information, customized identifiers, or routing information based on the relationship between the calling and called parties. The customized identifiers include, but are not limited to a name, a nickname, a relationship identifier (mother, father, son, daughter, etc.), and a group identifier (family, college, company, service provider, team, etc.). Routing information, discussed in greater detail below, includes, but is not limited to information to route a communication to a party, device, port, address, or application different from that originally requested.

Optionally, the caller information system is utilized when a caller calls a VoIP enabled device. The caller information system retrieves the caller identification information from the CNAM database using queries (including, but not limited to an SS7 query) and provides the caller ID to the called VoIP device.

Through the caller information system, an end-user of a caller ID capable device obtains user-customized versions of caller information rather than, or in addition to, information reflected in a CNAM or similar information service.

For example, traditionally, a CNAM database will provide the identification of the phone number of the calling party to the called party. In the present disclosure, the identification or number of the calling party is used to identify the set of customized identifications associated with the calling party. The identification of the called party can then be used to select from one of the set of customized identifications for display to the called party.

FIG. 1 illustrates an example of customized identification selection. In this particular example, the calling party 101 has several customized identifications 103, 105, 107 associated therewith. The selection of customized identifications 103, 105, 107 depends on the called party. For example, when the calling party 101 calls Party 1, Party 1's display reads "Mom" 103. This corresponds to a situation where the calling party 101 is Party 1's mother. Alternatively, upon calling Party 2, Party 2's display reads "Mary" 105. This corresponds to a situation where the calling party 101 is Party 2's peer or friend. Further, upon calling Party 3, Party 3's display reads "Aunt Mary" 107, corresponding to a situation where the calling party 101 is Party 3's aunt. Alternatively, the calling party may choose to provide no or a scrambled/anonymized customized identifier when calling a party not on a predetermined list. The calling party 101 optionally manages the various customized identifications 103, 105, 107 and associations with parties and/or phone numbers through a user management system, which is discussed in greater detail elsewhere in the disclosure.

In another aspect, a cache database is maintained to store caller ID information retrieved from an external database such as a CNAM database. Typically, there is a charge associated with each lookup query for the CNAM database. To avoid the charges, a cache of previous CNAM lookups can be maintained and utilized to provide customized ID information. The cache database is optionally accessed by the caller information system for subsequent calls to the VoIP phone from the same caller. Thus redundant or frequent lookups to the CNAM database, and the associated charges, for the same caller can be reduced.

In yet another aspect, a user management system is provided to enable a user to manage relationships and custom calling information and routing. Optionally, the user management system includes a user contacts database in which to record customized identification and routing information according to relationships between parties.

FIGS. 2a-c illustrate additional examples of customized identifications in operation. In a selected embodiment, caller A's phone number (or originating device 201a) is associated with B (or called number B) to provide customized information. In the depicted examples, the association between the numbers reflects the parties' family relationship. In certain embodiments, a user contacts database is maintained to identify caller A as "Son" on the display of B's phone 203a. Alternatively, when B calls A, B is identified as "Mother" on A's device 201b. The user contacts database optionally stores multiple relationships for a single phone number, device, or user account. For example, A may be associated with a number for C, his sister, in the user contacts database. Upon calling C, A is identified as "Brother John" on C's device 205c.

Although FIGS. 2a-c illustrate examples of outbound customized identifiers, it is noted that select embodiments also provide inbound customized identifiers. For example, a caller may provide customized identifiers for incoming calls to replace, alter, or augment received caller information.

It is noted that the associations or relationships among parties are optionally based on a variety of identifiers. These identifiers include, but are not limited to, phone numbers, IP addresses, email addresses, device addresses, usernames, account identifiers, and party names.

Further, it is noted that the associations may exist or be identified among a variety of such identifiers to accomplish various degrees of customization. For example, a party's account identifier may be directly associated with the account identifier of another party, so any communication between phone numbers or devices associated with the respective accounts initiates a customized caller identification or action including, but not limited to, customized routing.

Alternatively, embodiments provide customization at lower levels of granularity. For example, a customized caller identification or routing may be provided upon sending or receiving a particular type of communication (for example, a voice call) from a party's particular device (for example, a POTS phone) associated with a particular phone number (for example, home). Alternatively, caller identification or routing may be customized within a user account based upon sending or receiving an SMS from a mobile phone associated with a business phone number. Additional variations among the identifiers, devices, and communication types are also accommodated. Customization at lower levels of granularity can allow, for instance, particular types of customized identifiers to reach a called party's particular device or enable automatic routing of a communication and customized identifier to a capable and/or preferred device of the called party.

Rather than relying only on the information delivered from the PSTN or CNAM database, various embodiments described herein enable individual customers to specify more descriptive and/or corrected caller name and number information.

By implementing custom caller information services in the network, subscriber devices are capable of using these features without reliance on per-device "phonebook" or caller information. Caching of caller name information and storing custom identifiers can save costs since subscriber-provided caller-name information can be used in lieu of making a query to an external CNAM database which carries a per-transaction cost.

In selected embodiments, user-specified caller information obviates the necessity of requiring a lookup from the CNAM database. In other alternative embodiments, not all paired relationships from the user management system are provided to the caller information system and may be stored in the cache database to avoid frequent lookups in the user contacts database.

Further, the user management system and cache database are of use when receiving international calls and calls from mobile numbers. In these situations, a traditional CNAM or ISDN-PRI lookup may return an incorrect number or no number at all.

Figure 3:
FIG. 3 illustrates an example of customized routing.

In a further aspect, a user can also specify information related to the routing of phone calls as a function of the calling party. In selected embodiments, a specific forwarding policy may be implemented which replaces the original number being called. For example, as shown in FIG. 3, a user associated with called number A 301 (the user at A) can specify that a phone call from Calling Party 1 (phone number B) be forwarded to number/device A' 303 upon receipt of Calling Party 1's call. Alternatively, the user at A can specify that a call from Calling Party 2 (phone number C) be forwarded to "mobile phone" A" 305 upon receipt of Calling Party 2's call. Optionally, the user at A can set up a daisy-chained ringing scheme 309 in which a call from Calling Party 3 first rings the "home" number 307, then the "mobile phone" 305, and then the "business phone" 303 in sequence. Alternatively, any subset of these devices may be rung simultaneously, with the call connected to the receiving device at which the called party first answers.

In yet another alternative, the customized routing can be effectuated as a function of the calling party's caller identification or the calling party's customized identifier. Optionally, the customized routing can be effectuated as a function of a part of the customized identification.

For example, a called party may select to have incoming calls to the called party's home phone number exhibiting customized caller identifiers "Dad's office" and "Mom's office" forwarded the called party's business phone. In another example, the called party may optionally select to have incoming calls to the called party's home phone number exhibiting customized identifiers "Dad's _____" forwarded to the called party's mobile phone, where "_____" denotes that the portion of the identifier after "Dad's" is not used in effectuating customized routing. The relevant portion of the customized identifier may be in any portion of the displayed identifier, or in a portion which is not displayed, such as a metadata tag.

In yet another example, where the displayed customized identifiers "Mom's mobile" and "Dad's mobile" and "Brother John's home" also include a group identifier (for example, a customized identifier denoting a "family" relation), all similar customized identifiers may be selectively routed to a particular number or device, such as the called party's home phone number. Alternatively, if the received customized identifier is not recognized (for instance, no data or not included in a preferred list of contacts), the caller may be automatically routed to a voice mail service or automated message describing that the call cannot be accepted. In addition to being input or managed by a called party, group and other customized identifiers may be associated with buddy lists, preferred caller lists, or identify the caller's service provider. Accordingly, a called party may select customized routing of groups of known and unknown possible calling parties.

Although FIG. 3 illustrates an example of customized inbound routing, it is noted that select embodiments enable a caller to customize outbound routing of communications. For example, a calling party can customize daisy-chain and simultaneous ringing schemes for a particular called party.

Further, selected embodiments provide a database (or databases) of associated phone numbers and allows customer specific information relating to call routing, caller identification and other enhancements to be stored and accessed as function of the association between the phone numbers of the called and calling parties. In addition to recording user's proactive customizations, selected embodiments apply learning logic to the database to recognize calling behavior patterns. These patterns are optionally used to suggest to users incentives such as preferred calling plans among frequently called numbers or a change in plan to reduce the user's subscription cost according to past use patterns including, but not limited to, call times, call costs, and call distances.

In another example, a caller on the PSTN calls a VoIP customer. Through various disclosed embodiments, the PSTN caller's information can be updated on a per-user basis, customized by the end user. Further, the VoIP customer can provide a customized version of the caller name string as an alternative to the one provided in the ISDN signaling message, or to the one returned via an SS7 dip to an external CNAM database. Alternatively, the VoIP customer may also specify a replacement for the calling number as well. This replacement is useful, for instance, if the VoIP customer wants to use the "call back" feature in a caller-ID enabled phone and knows that the PSTN caller prefers an alternative number over the number from which the call was received.

Figure 4:
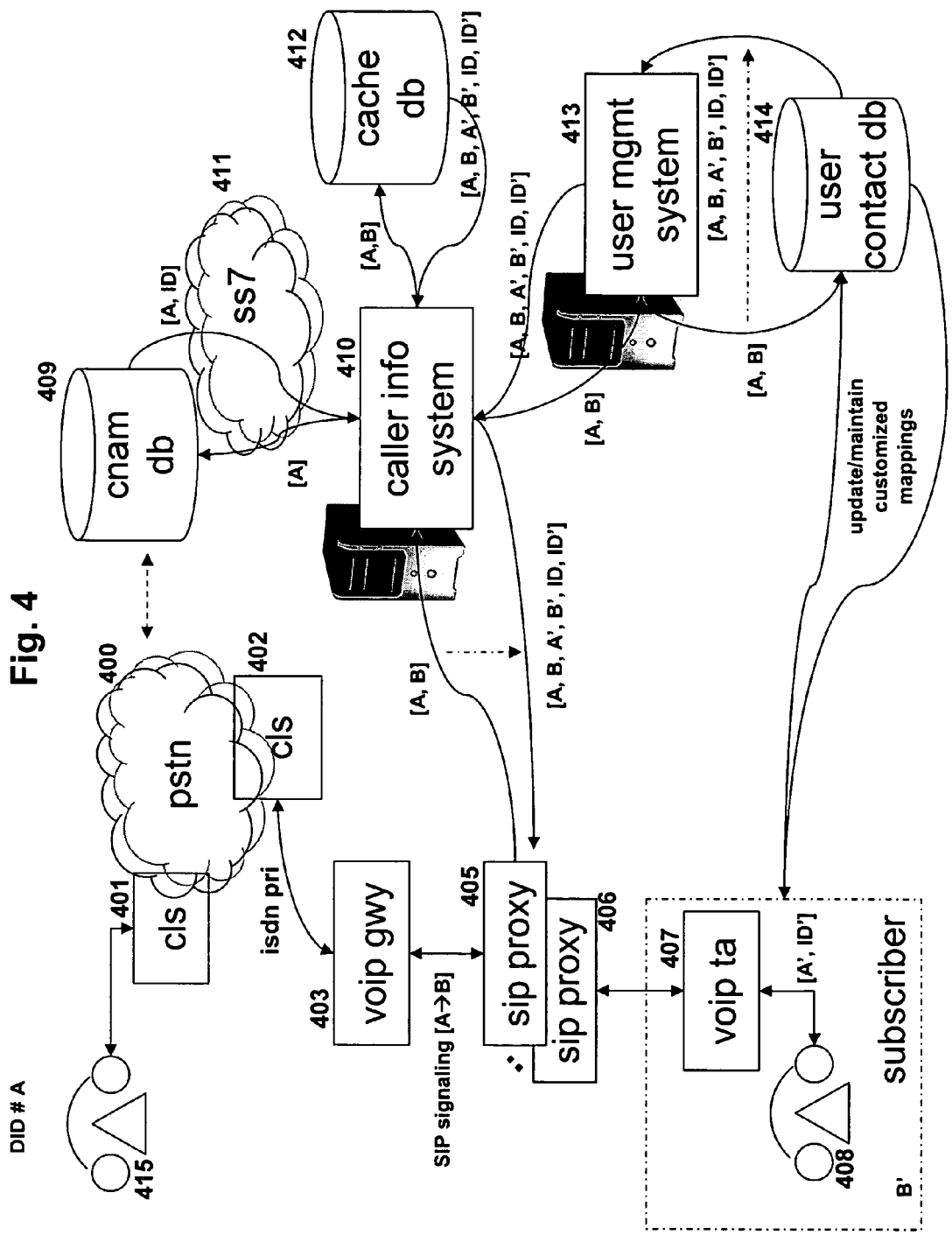
FIG. 4 is a schematic representation of an embodiment of the present disclosure.

FIG. 4 illustrates a schematic representation of an embodiment of the present disclosure. In a non-limiting exemplary embodiment:

A represents caller's the actual DID telephone number;
B represents the number that was called;
ID represents the Caller name string obtained from CNAM or the cache;
ID' represents the customized Caller name string;
A' represents the customized caller number delivered to telephone being called; and
B' represents actual number call will be delivered to.

In this example, a PSTN user with a phone 415 connected to switch (CLS) 401, with Direct Inward Dialing (DID) number A calls a VoIP subscriber at phone number B over the PSTN 400. Caller ID with name signaling tones generated by VoIP telephone adapter (TA) 407 transmit the caller's delivered phone number A' and customized name string ID' to phone 408.

A' may be defined to be A, with the ID discovered via ISDN-Primary-Rate Interface (PRI) signaling. Alternatively, a CNAM lookup is performed from caller information system 410 using a SS7 query over SS7 transport 411 to CNAM database provider 409, thereby returning (and optionally caching) the information ID in database 412.

In an optional optimization, the caller information system 410 consults a local cache database 412 to reduce the frequency of lookups to CNAM database. Caller information system also optionally consults the user management system 413 by making a query, passing both A and B identifiers. The user management system 413 queries a user contact database 414 with A and B to identify customer specific information stored therein for the pair A, B. In selected embodiments, the lookup returns user-specified name information ID' as well as an alternative identifying calling number A'. Optionally, alternative calling number A' enables returned calls to be automatically directed to an alternative number. Further, alternative destination number B' may be returned to affect per-caller forwarding or other customized treatment. In the illustrated example, all information is returned to caller information system 410 where it may be cached in the cache database 412. Alternatively, the caller information system 410 may selectively discard or alter the received custom data to be cached in accordance with at least storage constraints, database relationship structure, and query speed optimization.

The caller information system 410 returns the results of the query for caller name information to a Session Initialization Protocol (SIP) proxy 405. The SIP call processing elements 405, 406 optionally update the signaling information according to policy to include the new called number, caller number and caller name information. The call is then signaled to VoIP TA 407. This signal includes, but is not limited to, a SIP INVITE signal.

Consequently, the VoIP TA 407 rings telephone 408, and passes customized caller ID information using standard caller-ID signaling tones to telephone 408 containing calling number A' and the customized caller name ID'.

Further, although the described operational example relates to a communication from the PSTN to a VoIP subscriber, alternate embodiments provide for a customized identifier and/or customized routing for VoIP-to-PSTN and VoIP-to-VoIP communications.

The subscriber obtaining service using TA 407 and telephone 408 can query, update, and maintain the subscriber's own customized caller information or routing in user contacts database 414 using a variety of methods, including a web/http interface or a customized client application. Using any one of these methods, the user can also specify replacement numbers and names for known callers.

In selected embodiments, the customized delivered caller number A' and/or customized caller name ID' is a customized identifier including, but not limited to, alphanumeric text, a graphic, a sound, a song, a ring tone, or a video. Further examples of these customized identifiers, such as relational text, are described above. The customized identifiers are optionally set by a user through the user management system 413. In addition to being directly delivered to a called party or device, an identifier may be retrieved by the receiving device from local or networked storage (for instance, the user contact database 414) using a pointer (for instance, a URL) delivered to the VoIP TA 407 or capable phone devices 408.

Further, selected embodiments apply to image or video communications, such as video phones. For example, in addition or instead of an alphanumeric text string, a customized caller identifier for video chatting may include an avatar or thumbnail image of a caller to be presented to the called party. Such image-based identifiers may also be used in connection with a standard voice call if the receiving/called device, for instance a mobile phone with LCD, is capable of displaying an image or video.

Certain embodiments interface with Wireless Caller Name (WCNAM) delivery services in addition to traditional CNAM databases. Moreover, with the cache database 212, selected embodiments provide validation (or indicate a validated entry) that caller information corresponds to true caller or caller's number. For instance, a user may discriminate against a concealed telemarketer based on an indicator denoting a lack of correspondence between a number in the cache database versus a number retrieved from a CNAM for a given calling party.

Optionally, the custom user contact database 414 is synchronized, imported/exported from, or otherwise associated with a VoIP subscriber's contacts in a personal information management (PIM) program, a social networking site, or an instant messaging (IM) "buddy" list. Further, the user management system 413 and associated services may notify selected subscribers, contacts, or "buddies" of an updated phone number or other changed contact information.

Furthermore, selected embodiments enable selective blocking/acceptance based on caller ID. Alternatively, embodiments provide an inbound customization override capability enabling a called party to selectively override a calling party's customized identifier. For example, a caller may choose to disable or replace a calling party's customized identifier, such as an animation or sound. Optionally, permissions are set for displaying information to parties outside those associated with the subscriber in the user contacts database 414. Further, selected embodiments indicate whether the caller is within a preferred network (will use peak minutes, international, incoming collect call, etc.) to allow receiving party to discriminate whether to pick up a call and possibly incur charges.

Various embodiments provide a customized caller identification system on the network level rather than on the individual phone level. The customized identifier of a caller is thereby provided to all conventional caller ID phones and not just specially programmed phones. Further, by embedding this capability in the telephone network call processing, the capability is now commonly available to any Caller-ID with Name capable devices. Accordingly, various embodiments provide substantial commercial value through cost savings and providing unique capabilities not otherwise available.

Figure 5:
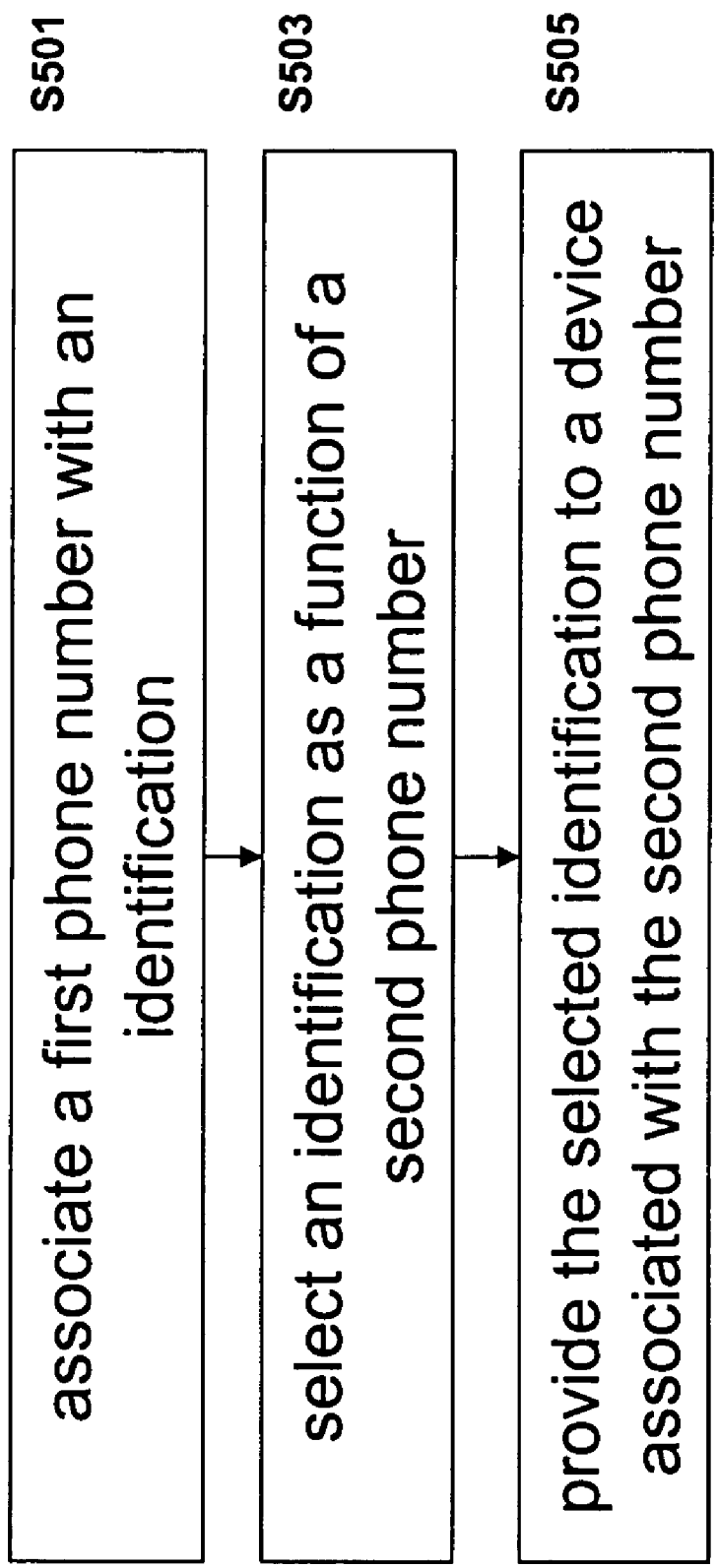
FIG. 5 is a flow chart representing an exemplary process.

FIG. 5 illustrates a flow-chart example of a customized identification process according to a disclosed embodiment. In FIG. 5, a first phone number is associated with user specified identifications S501. As discussed previously, examples of a phone number and other identifiers includes, but is not limited to, phone numbers, IP addresses, email addresses, device addresses, usernames, account identifiers, and party names. Further, user specified identifications include, but are not limited to, alphanumeric text, a graphic, a sound, or a video.

In response to a phone call placed from the first phone number to the second phone number, one of the user-specified identifications is selected as a function of the second phone number S503. As described above, the relationships on which this selection is based includes the numerous possible variations among the identifiers, devices, and communication types. For example, the selection can alternatively be made on the basis of an account of a called party, a called party's particular device, IP address, or phone number, or even whether the communication is simply voice or voice combined with video.

The selected identification is then provided to the user of the second telephone number S505. As also described above, providing the selected identification may involve either direct delivery or delivery of a pointer to the selected identifier.

Process descriptions or blocks in flow charts should be understood as representing modules, segments, or portions of computer software or code which include one or more executable instructions for implementing specific logical functions or steps in the process, and alternate implementations (including implementations without a computer) are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

The embodiments disclosed herein for providing caller information and routing can be implemented using computer usable medium having a computer readable code executed by special purpose or general purpose computers.

What is claimed is:

1. A method of routing a call when a caller at a first phone number calls a user at a second phone number comprising:
    (a) associating the first phone number in a database with a customized routing instruction selected by the user and a customized identifier selected by the caller that was previously provided by the caller to the user, the customized routing instruction including a third phone number;
    (b) selecting the third phone number in response to a phone call placed from the first phone number to the second phone number as a function of the customized identifier; and
    (c) routing the phone call from the first phone number to the third phone number.

2. The method of claim 1 further comprising modifying the call routing instruction for a selected associated pair of first and second phone numbers.

3. The method of claim 1, further comprising:
   (d) routing the phone call from the third phone number to a fourth phone number using the selected call routing instruction.

4. The method of claim 3, further comprising:
   (e) routing the phone call from the third phone number to a fourth phone number after a predetermined time.

5. The method of claim 1, further comprising:
   (d) routing the phone call from the first phone number to at least a third phone number and a fourth phone number simultaneously.

6. The method of claim 5, further comprising:
   (e) detecting a channel opening at a terminal device; and
   (f) completing the phone call to the terminal device.

7. A method of customizing communications between a caller at a first phone number and a user at a second phone number comprising:
   (a) associating a first phone number in a database with a plurality of user specified identifications;
   (b) selecting one of the plurality of user specified identifications in response to the phone call placed from the first phone number dialed to a second phone number, the selecting of the user specified identification based on the second phone number; and
   (c) providing the selected one of the plurality of user specified identifications to a device associated with the second telephone number;
   (d) associating the first phone number with customized routing instruction selected by the user and the selected one of the plurality of user specified identifications, wherein the customized routing instruction including a third phone number;
   (e) selecting the third phone number in response to a phone call placed from the first phone number to the second phone number as a function of the customized identifier; and
   (f) routing the phone call from the first phone number to the third phone number.

8. The method of claim 7 wherein the database is located in a location remote from the user.

9. The method of claim 7, further comprising:
   (d) displaying text corresponding to the selected one of the plurality of identifications.

10. The method of claim 7, further comprising:
    (d) displaying an image corresponding to the selected one of the plurality of identifications.

11. The method of claim 7, further comprising:
    (d) providing an audible tone corresponding to the selected one of the plurality of identifications.

12. The method of claim 7, further comprising:
    (d) providing a video corresponding to the selected one of the plurality of identifications.

\* \* \* \* \*